United States Patent [19]

Nussbaumer

[11] 3,912,917

[45] Oct. 14, 1975

[54] DIGITAL FILTER

[75] Inventor: Henri Nussbaumer, La Gaude, France

[73] Assignee: International Business Machines Corporation, Armonk, N.Y.

[22] Filed: Oct. 10, 1974

[21] Appl. No.: 513,797

[30] Foreign Application Priority Data

Oct. 23, 1973 France .............................. 73.38741

[52] U.S. Cl. ................. 235/156; 235/152; 328/167

[51] Int. Cl.² .......................................... G06F 15/20

[58] Field of Search ............. 235/152, 156; 328/167

[56] References Cited

UNITED STATES PATENTS

| | | | |
|---|---|---|---|
| 3,579,109 | 5/1971 | Hatley | 235/152 UX |
| 3,723,911 | 3/1973 | Forney | 328/167 X |
| 3,736,414 | 5/1973 | McAuliffe | 235/152 UX |

*Primary Examiner*—R. Stephen Dildine, Jr.
*Attorney, Agent, or Firm*—Delbert C. Thomas

[57] ABSTRACT

A —$n$ coefficient digital filter in which the sample $y_i$ of the filtered signal at instant $i$ is derived from the sum $$\sum_{k=1}^{n} a_k \cdot x_{1-k}$$

where $a_k$ are coefficients defining the filter characteristics and the $x_{i-k}$ are the successive preceding data samples, said filter including a first set of means for computing a value $$U_i = \sum_{p=0}^{n/2-1} (x_{i-2p-1} + a_{2p+2}) \cdot (x_{i-2p-2} + a_{2p+1}),$$

a second set of means for computing a value $$V_i = - \sum_{p=0}^{n/2-1} x_{i-2p-1}\, x_{i-2p-2}$$

a third means for providing a constant value $w_i$ obtained by adding together the products of pairs of consecutive filter coefficients, i.e., $$w_i = - \sum_{p=0}^{n/2-1} a_{2p+2} \cdot a_{2p+1}$$

and a fourth means for adding together the values provided by said first, second and third means.

2 Claims, 17 Drawing Figures

TRANSVERSAL
FILTER

RECURSIVE
FILTER

DIGITAL FILTER

This invention relates to a digital filter.

A digital filter is a device used to determine the values of the successive samples of a filtered signal by forming the sums of algebraic products derived from the signal and from prior signals. More specifically, if $x_{i-1}$ is the sample at instant $(i-k)$ of the signal to be filtered, the sample $y_i$ of the filtered signal at instant $i$ may be computed from the expression:

$$y_i = \sum_{k=1}^{n} \alpha_k \cdot x_{i-k},$$

where $\alpha_k$ is a constant coefficient which depends upon the characteristics of the desired filter. A filter capable of performing this operation is called a "transversal" filter. However, sample $y_i$ can also be determined from an expression which uses the previously computed samples $y_{i-k}$, namely:

$$y_i = a_1 x_i + \sum_{k=1}^{n} b_k \cdot y_{i-k}$$

in which case the filter obtained is said to be "recursive". The above expressions show that, whether a transversal or a recursive filter is used, the computation of every $y_i$ requires $n$ multiplications. This is a major disadvantage since the multipliers which can be manufactured using present-day technologies are expensive devices.

It would, therefore, be desirable to provide digital filter structures that would allow the number of multipliers required to be substantially reduced.

It has previously been proposed to dispense with the multipliers altogether by storing in a memory all of the combinations that are necessary to compute $y_i$. However, this sophisticated approach requires the use of costly memories and addressing circuits, and would therefore be justified only if the same filter were made to process a large number of signals simultaneously, using multiplexing techniques. In practice, it is not always possible to take full advantage of the capabilities of these filters, so that their use is generally not economical.

Accordingly, it is the object of the present invention to provide digital filters which comprise a limited number of multipliers.

The foregoing and other objects, features and advantages of the invention will be apparent from the following more particular description of a preferred embodiment of the invention, as illustrated in the accompanying drawings.

In the following description and in the appended drawings, all signal data lines and coefficient data lines are referred to as a single input, but it should be understood that a data input or coefficient are usually a parallel combination, a word or byte, of binary signals on a data bus. With this in mind, it will be seen that a shift register will comprise a plurality of paralleled single bit shift registers, one for each of the signal lines of the attached data busses. The data representing signal combinations on the shift register inputs will be passed through the register under control of the conventional clock input which will be activated at the signal sampling rate or some multiple thereof if signal multiplexing is provided in the system. When a filter is designed to process a serial presentation of bits, it will be specifically noted.

The logic blocks set out in this specification perform conventional functions and many forms thereof are available as unitary proprietary modules. For purposes of this disclosure, it may be assumed that the logic blocks are operative as set out in the book, "Arithmetic Operations in Digital Computers," by R. K. Richards, published by D. Van Nostrand Co., in 1955 with a Library of Congress Catalog Card No. 55-6234 and using the type of circuits described in "Manual of Logic Circuits," by Gerard A. Maley, published by Prentice-Hall, Inc., in 1970 and with a Library of Congress Catalog Card No. 74-113716.

As noted above, the shift registers herein are a parallel array of bit shift registers, each of which may be organized as set out in the Richards book at pages 144 to 148 and using specific circuits as set out by Maley at pages 128–142 or pages 266–275. The internal organization of a binary adder for plural bit entries is shown by Richards in Chapter 4, pages 81–98 and may be modified using adder circuits as described by Maley, see pages 61–65 or pages 171, 172. The multiplier blocks referred to herein may have internal connections as described in Chapter 5 of the Richards book, particularly pages 136 to 144, but using updated transistor and adder circuits as described by Maley. There are many commercial shift registers, adders, and multipliers capable of use in the described invention and available in the electronic markets today. As such logic devices are made available in the form of sealed modules having internal proprietary circuits, their internal arrangement may be different from the above but they may still be utilized in the performance of the invention.

Figure 1A:
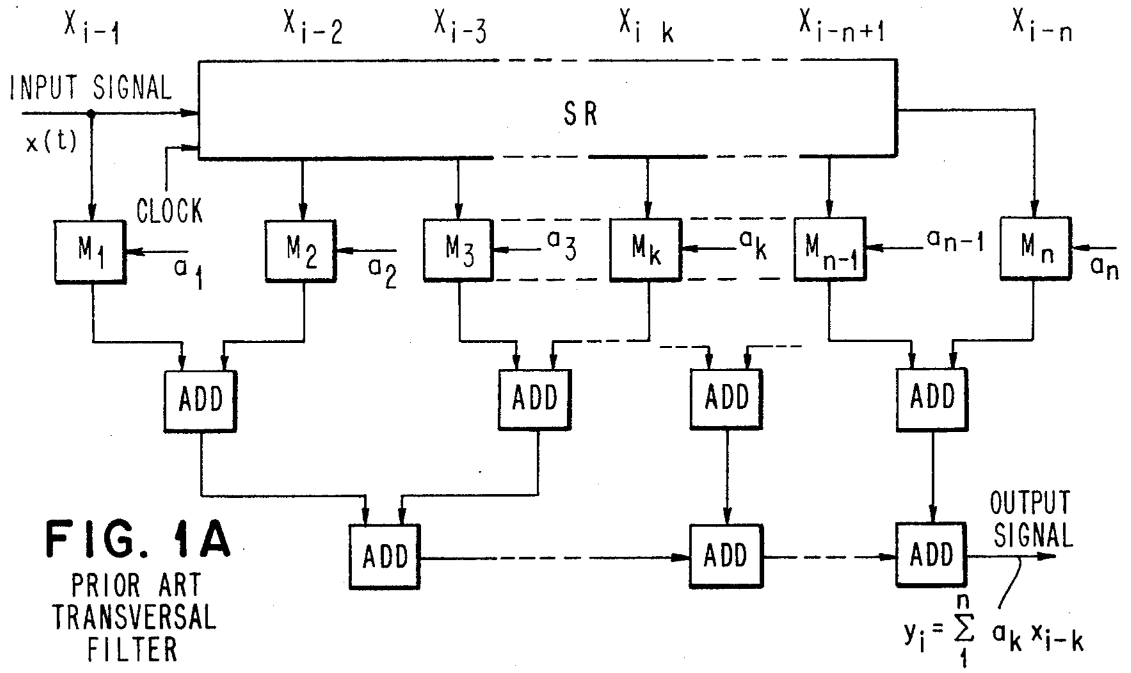
FIG. 1A PRIOR ART
FIGS. 1A and 1B show a conventional transversal filter and a conventional recursive filter, respectively.

Referring now to FIG. 1A, a conventional transversal filter is shown. This filter includes a tapped delay line or shift register SR to the input of which are fed samples of the signal to be filtered and which can store $n-1$ of the last signal samples. The taps allow each signal sample stored within the register to be individually weighted with coefficients $a_k$ and all weighted samples are then added together to provide the filtered signal. More specifically, at instant $i-1$, input sample $x_{i-1}$ is fed to a shift register SR with $n-1$ stages containing the earlier samples $x_{i-2}, x_{i-3} \ldots x_{i-n}$, respectively, $n$ corresponding to the number of weighting coefficients of the filter to be realized. The quality of the filter will depend, among other things, on this number and it is not unusual for the value of $n$ to be of the order of 100. Each of the signal samples available at the taps of register SR is multiplied by a related coefficient $a_1$–$a_n$ in one of a set of multipliers $M_1$–$M_n$, and the products thus obtained are algebraically added together to provide $$y_i = \sum_{1}^{n} a_k \cdot x_{i-k} \qquad (1)$$

Figure 1B:
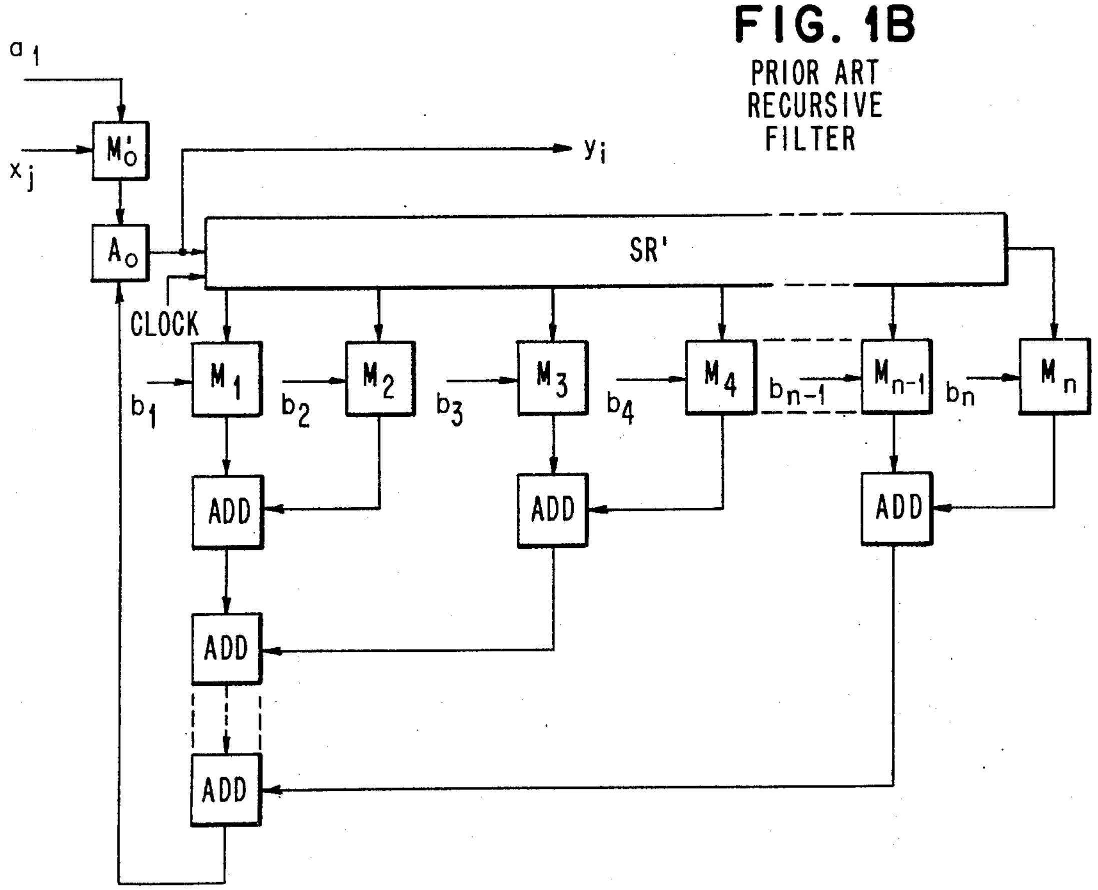
FIG. 1B PRIOR ART

In the case of the conventional recursive filter shown in FIG. 1B, the bits of input sample $x_i$ are fed at instant $i$ to a multiplier $M_0'$ which performs the operation $a_1 x_i$ and sends the result thereof to an adder $A_0$. The output from $A_0$ is sent to a shift register SR', but also represents $y_i$. Accordingly, register SR' contains earlier samples $y_{i-1}, y_{i-2} \ldots y_{i-n}$. These signals are then weighted with coefficients $b_1$–$b_n$ and added together in the same manner as for the transversal filter to provide:

$$y_i = \sum_{i}^{n} b_k \, y_{i-k}.$$

This term is fed to the second input of adder $A_0$, the following being obtained at the output thereof:

$$y_i = a_1 \cdot x_i + \sum_{1}^{n} b_k \cdot y_{i-k}. \qquad (2)$$

Expressions (1) and (2) include a term the computation of which requires $n$ multiplications. The present invention allows the number of multipliers which are required in the filter to be substantially reduced.

It will be observed that the general equation for a filter more complex than those described above may be written as:

$$y_i = \sum_{0}^{q} a_k \cdot x_{i-k} + \sum_{1}^{q'} b_k \cdot y_{i-k} \qquad (3)$$

or, still more generally:

$$y_i = \sum_{1}^{n} \alpha_k \cdot z_{i-k} \qquad (4)$$

where the $\alpha$ are the filter coefficients and the $z$ are the data, whether these pertain to the transversal or to the recursive loop.

Now $\alpha_k . z_{i-k} + \alpha_{k+1} z_{i-k-1} = (\alpha_{k+1} + z_{i-k})(\alpha_k + z_{i-k-1}) - z_{i-k} \cdot z_{i-k-1} - \alpha_{k+1}\,\alpha_k.$ Thus, for $k=2p$ $$y_i = \sum_{0}^{n/2-1} (z_{i-2p-1} + \alpha_{2p+2})(z_{i-2p-2} + \alpha_{2p+1}) - \sum_{0}^{n/2-1} z_{i-2p-1} \cdot z_{i-2p-2} - \sum_{0}^{n/2-1} \alpha_{2p+2} \cdot \alpha_{2p+1} \qquad (5)$$

Similarly, $$y_{i-2} = \sum_{0}^{n/2-1} (z_{i-2p-3} + \alpha_{2p+2})(z_{i-2p-4} + \alpha_{2p+1} - \sum_{0}^{n/2-1} z_{i-2p-3} \cdot z_{i-2p-4} - \sum_{0}^{n/2-1} \alpha_{2p+2} \cdot \alpha_{2p+1}.$$

$$y_i = u_i + v_i + w_i \qquad (6)$$

where $$u_i = \sum_{0}^{n/2-1} (z_{i-2p-1} + \alpha_{2p+2})(z_{i-2p-2} + \alpha_{2p+1}) \qquad (7)$$

$$v_i = -\sum_{0}^{n/2-1} z_{i-2p-1} \cdot z_{i-2p-2} = v_{i-2} - z_{i-1} \cdot z_{i-2} + z_{i-n-1} \cdot z_{i-n-2} \qquad (8)$$

$$w_i = -\sum_{0}^{n/2-1} \alpha_{2p+2} \cdot \alpha_{2p+1} \qquad (9)$$

Thus, a digital filtering function can be accomplished by adding together the three terms $u_i$, $v_i$ and $w_i$.

The above expressions can be made to apply to the transversal filter described by way of example, by simply substituting $x$ for $z$ and $a$ for $\alpha$. However, in the case of the recursive filter described above, we may write $y_i = a_1 x_x + u_i + v_i + w_i$, bearing in mind that $z$ and $\alpha$ now stand for $y$ and $b$, respectively.

Some remarks may be made at this point. First, it is apparent that the term $w_i$ is constant for a given filter. Thus, if $y_i$ is derived from expression (8), the processing of $w_i$ will require a single addition. Also, the term $v_i$ can be obtained from the previous $v_{i-2}$ and will require two additions and, normally, two products of $z$ terms. However, the result of the multiplication $z_{i-n-1} \cdot z_{i-n-2}$ will have been obtained during the computation of a previous $y$term, so that this operation can be dispensed with.

In summary, in order to perform a filtering operation using expression (6), a maximum of $n/2+3$ multiplications is necessary whereas with a conventional filter of the type illustrated in FIG. 1B, $n+1$ multiplications would be required.

Figure 2A:
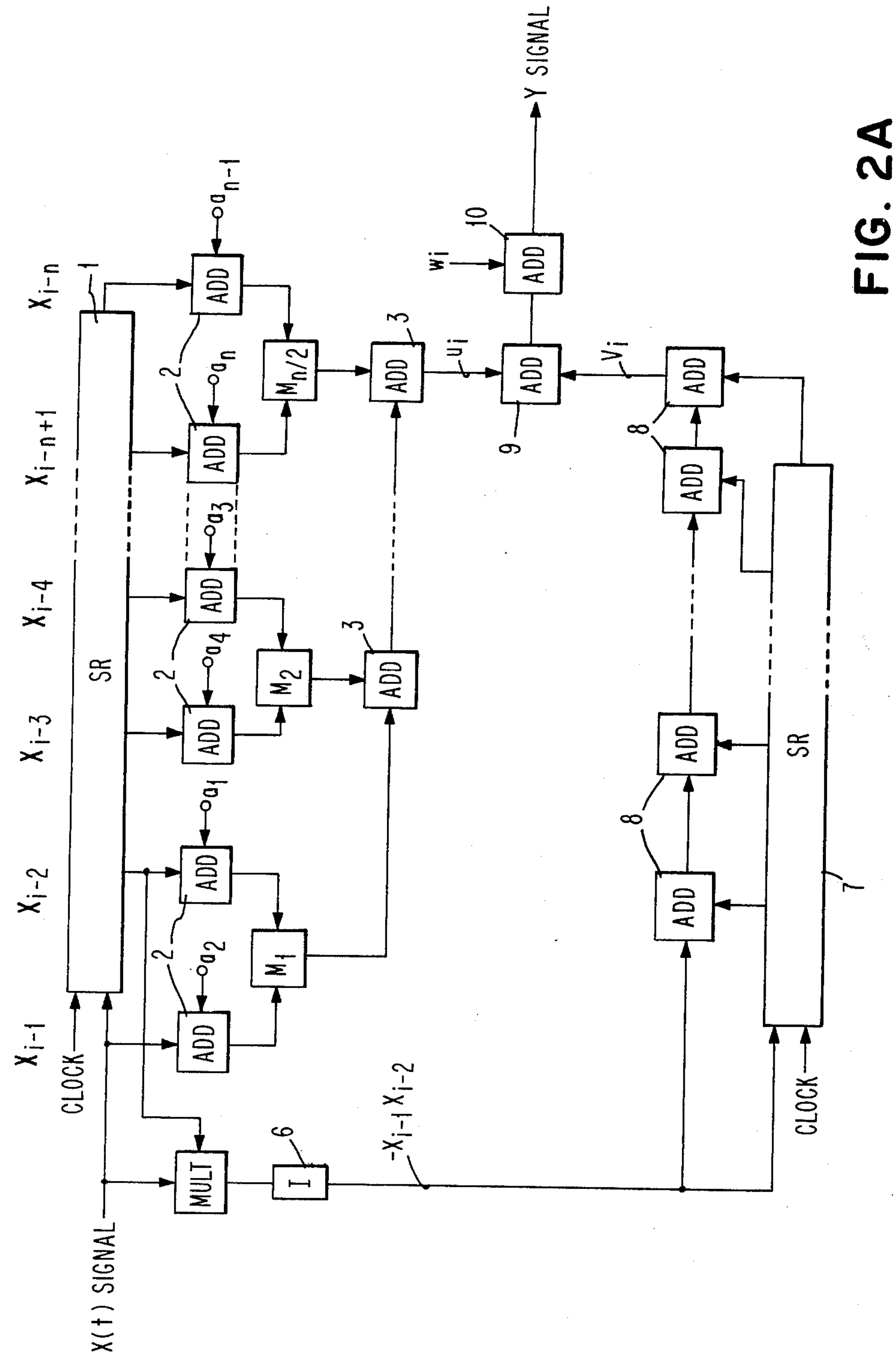
FIGS. 2A and 2B show a transversal filter realized in accordance with the present invention.

The present invention can be implemented in many different ways. For example, the embodiment diagrammed in FIG. 2A is a transversal filter which includes a tapped shift register 1 to the input of which clocked samples of a signal $x(t)$ are applied. When sample $x_{i-1}$ is received at its input, shift register 1 contains $x_{i-2}, x_{i-3}, x_{i-4} \ldots x_{i-n}$. Each tap is connected to one input of an adder circuit 2, the second input of which receives one of the constant coefficients $a_1$–$a_n$ of the filter. The outputs from two adjacent adders are multiplied together in a multiplier $M_1$, $M_2$ . . . or $M_{n/2}$. The term $u_i$ is then obtained by adding together in adders 3 the outputs from multipliers $M_1$ to $M_{n/2}$. An additional multiplier $M_0$, is provided to multiply the signal samples $x_{i-1}$ and $x_{i-2}$ to obtain $x_{i-1}.x_{i-2}$, and the sign of the result obtained is inverted by an inverter 6 to yield $-x_{i-1}.x_{i-2}$. A second shift register, 7, and a set of adders 8 connected in series, are provided to obtain the term $v_i$. As the term $-x_{i-1}.x_{i-2}$ is received at the input of shift register 7, which already contains the previously computed terms $-x_{i-2}.x_{i-3}$, $-x_{i-3}.x_{i-4}$ . . . $-x_{i-n+2}.x_{i-n+1}$, the term $-x_{i-n+1}.x_{i-n}$ leaves register 7. The first adder 8 receives $-x_{i-1}.x_{i-2}$ directly and $-x_{i-3}.x_{i-4}$ from register 7, and sends $-x_{i-1}.x_{i-2}-x_{i-3}.x_{i-4}$ to the next adder 8, which receives from register 7 the term $-x_{i-5}.x_{i-6}$ and computes the term $-x_{i-1}.x_{i-2}-x_{i-3}.x_{i-4}-x_{i-5}.x_{i-6}$. Thus, the last adder 8 in the set will compute the term $v_i$. Adding together $u_i$, $v_i$ and $w_i$ in adders 9 and 10 will then produce $$y_i = u_i + v_i + w_i = \sum_{k=1}^{n} a_k \cdot x_{i-k}.$$

As earlier noted, the term $v_i$ can also be computed from the term $v_{i-2}$ which was previously determined, using the expression:

$$v_i = v_{i-2}+x_{i-n-1};x_{i-n-2}-x_{i-1}.x_{i-2}$$

Figure 2B:
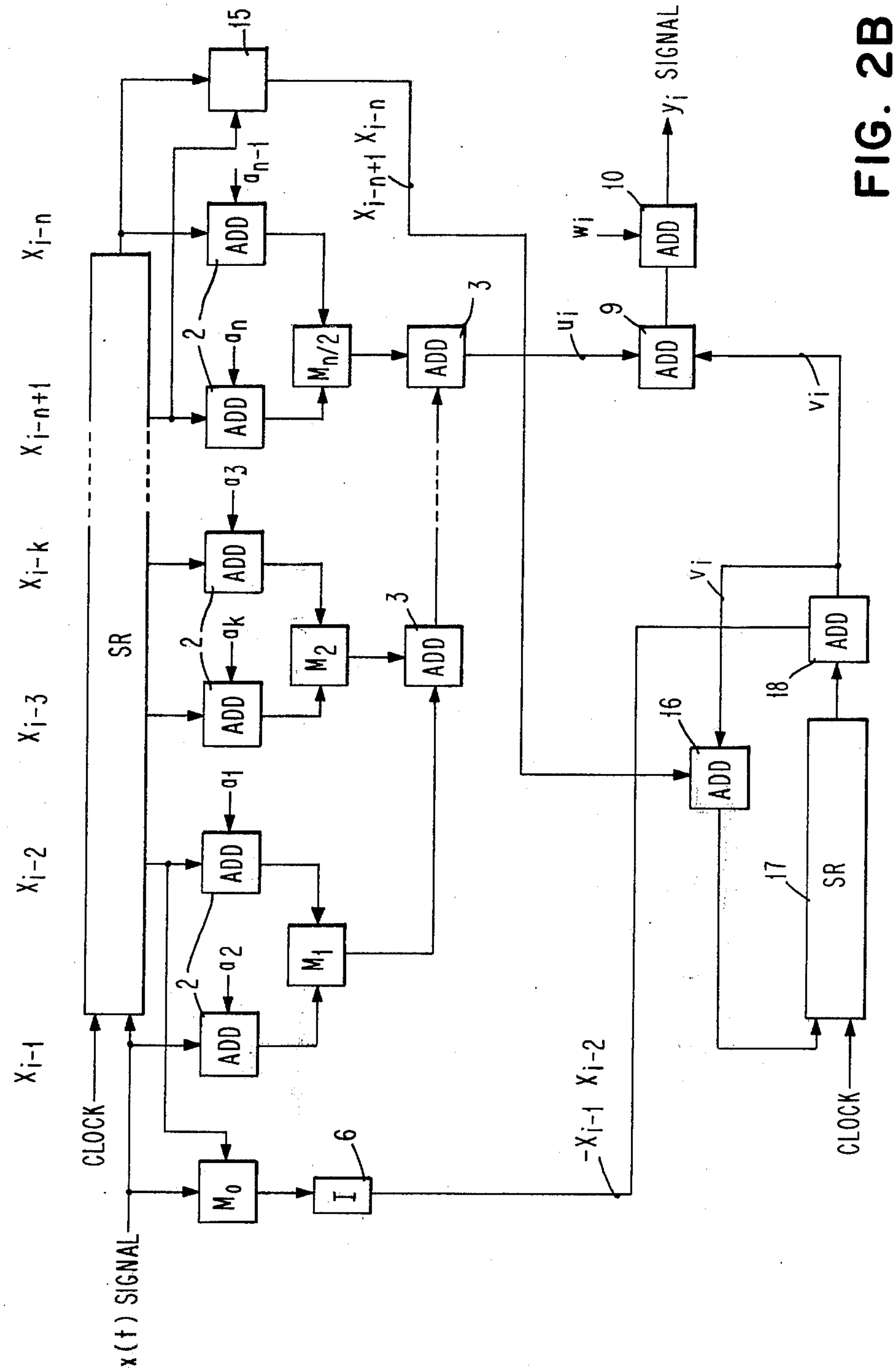

Accordingly, that part of the arrangement of FIG. 2A which is used to compute $v_i$ can be modified as shown in FIG. 2B. A multiplier stage 15 having inputs from the last two stages of register 1 provides the product $x_{i-n+1}.x_{i-n}$ which is added to $v_i$ in an adder 16. The result of this operation is sent to a shift register 17 which has two storage positions, which means that as $v_i+x_{i-n+1}.x_{i-n}$ is received from adder 16, the term $v_{i-2}+x_{i-n-1}.x_{i-n-2}$ leaves register 17. The addition by an adder 18 of the latter term and $-x_{i-1}.x_{i-2}$ from multiplier $M_0$ and inverter 6 will then provide the term $v_i$.

Figure 3:
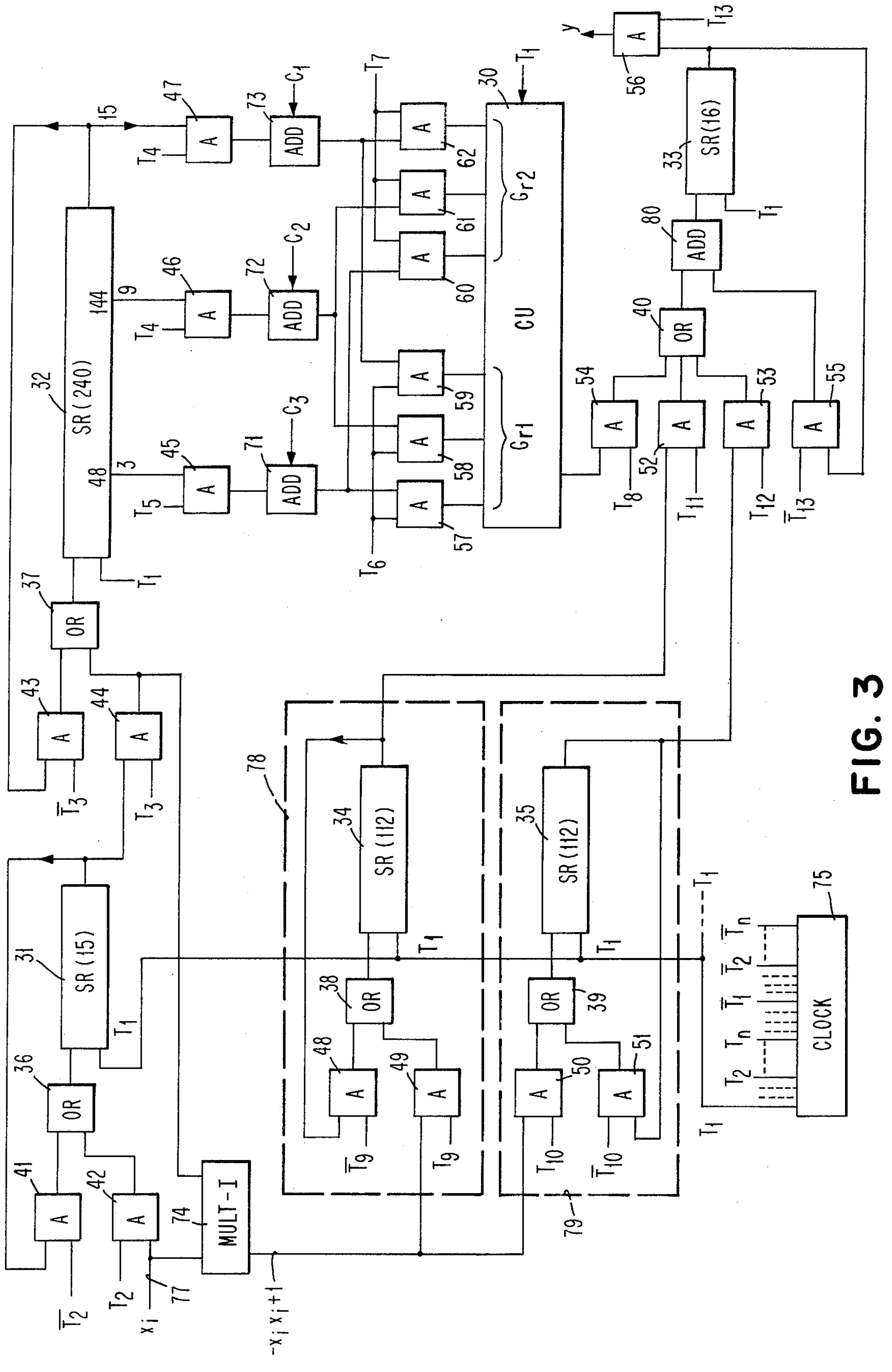
FIG. 3 shows another embodiment of the transversal filter realized in accordance with the present invention.

Referring now to FIG. 3, a serially processing embodiment of the transversal filter of the present invention is shown. For simplicity, it will be assumed that this filter has 16 weighting coefficients and is intended to process data samples coded into words of 16 serial bits. The filter essentially comprises a computation unit (CU) 30, several shift registers 31, 32, 33, 34, and 35, each storing a number of samples as indicated by the numbers thereon, OR gates 36 to 40 inclusive, AND gates 41–62 inclusive, serial binary adders 71, 72, and 73, see pages 128 et. seq. of the Richards book, a multiplier-inverter 74, and a clock 75 which generates signals T1, T2 . . . etc., and the complements $\overline{T1}$, $\overline{T2}$ . . . etc.

The multibit samples of $x$ are received sequentially via an input line 77 connected to one of the inputs of AND gate 42, which is activated when clock signal T2 is applied to its second input. The output of gate 42 is connected to the first input of OR gate 36, whose output is connected to the input of shift register 31 which comprises 15 bit positions. The output from register 31 is simultaneously sent to AND gate 41, which is activated when clock signal $\overline{T2}$ is applied thereto and whose output is connected to the second input of OR gate 36, and to an AND gate 44 which is conditioned by clock signal T3. The output of gate 44 is connected to one of the inputs of OR gate 37 the output of which is connected to the input of a tapped shift register 32 which has 240 bit positions. The output from register 42 is fed back to its input through AND gate 43, which is conditioned by clock signal $\overline{T3}$, and through the second input of OR gate 37. Register 32 includes three taps corresponding to bit positions 48, 144 and 240, respectively. These taps provide data to binary adders 71, 72 and 73, respectively, through AND gates 45, 46, and 47 which are respectively conditioned by clock signals T5, T4 and T4. The other inputs of adders 71, 72, and 73 are labeled C3, C2, C1, respectively. The outputs of adders 71–73 are simultaneously connected to a first group $G_{r1}$ of inputs of computation unit 30 through AND gates 57, 58 and 59, all of which are conditioned by clock signal T6, and to a second group $G_{r2}$ of inputs of CU 30 through AND gates 60, 61 and 62, all of which are conditioned by clock signal T7. The output of unit CU is connected to an input of OR gate 40 through AND gate 54 which is conditioned by signal T8.

The input line 77 and the output of AND gate 44 are connected to the inputs of a multiplier-inverter 74. The output of 74 is connected to a first device 78 comprising an AND gate 49 which is conditioned by clock signal T9 and the output of which is connected to the input of OR gate 38, whose output is connected to the input of a shift register 34 with 112 bit positions. The output of register 34 is fed back to the input thereof through AND gate 48, which is conditioned by clock signal $\overline{T9}$, and OR gate 38. The output of register 34 is also connected to a second input of OR gate 40 through AND gate 52, which is conditioned by clock signal T11. The output of multiplier 74 is also connected through a third input of OR gate 40 through a second device 79 similar to the one just described and comprising AND gates 50 and 51, which are conditioned by clock signals T10 and $\overline{T10}$, respectively, OR gate 39, shift register 35 and AND gate 53, which is conditioned by clock signal T12. The output of OR gate 40 is connected to the first input of an adder 80 the output of which is fed back to the second input of adder 80 through a shift register 33 with 16 bit positions and AND gate 55 which is conditioned by clock signal $\overline{T13}$. The output $y$ of the filter is connected to the output of register 33 through AND gate 56 which is conditioned by clock signal T13.

Figure 3A:
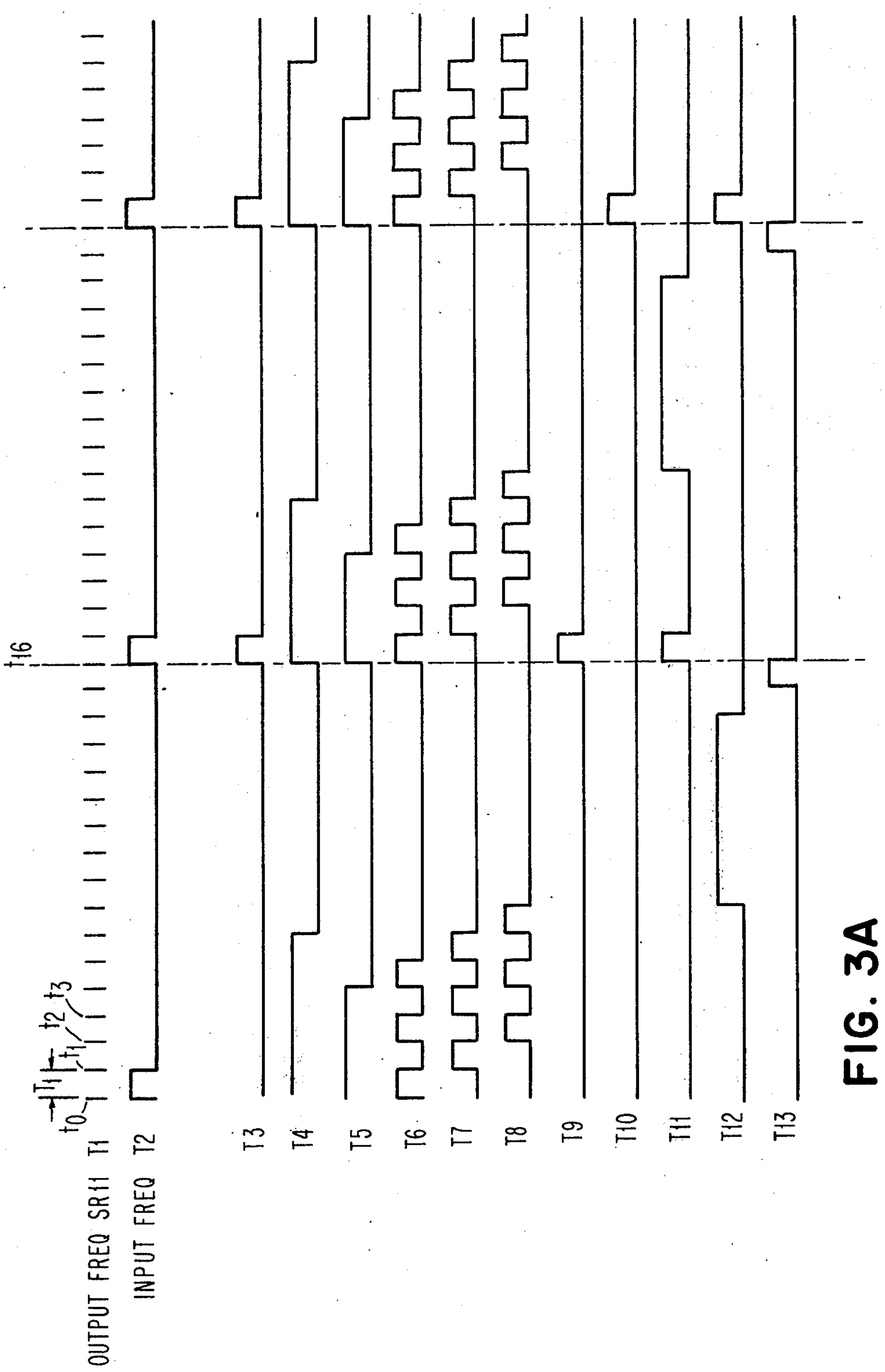
FIGS. 3A, 3B and 3C are timing diagrams illustrating the operation of the filter of FIG. 3.
Figure 3B:
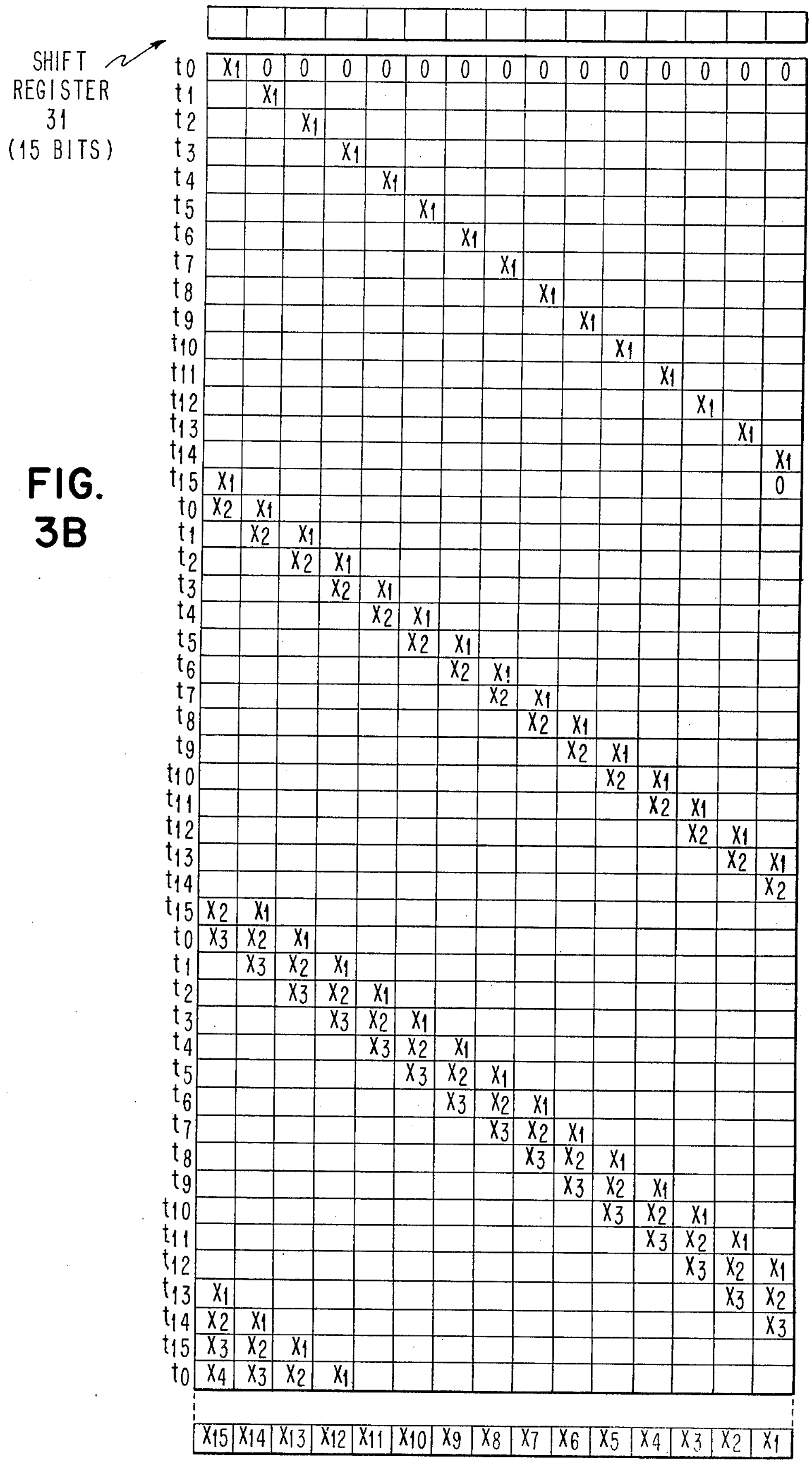
Figure 3C:
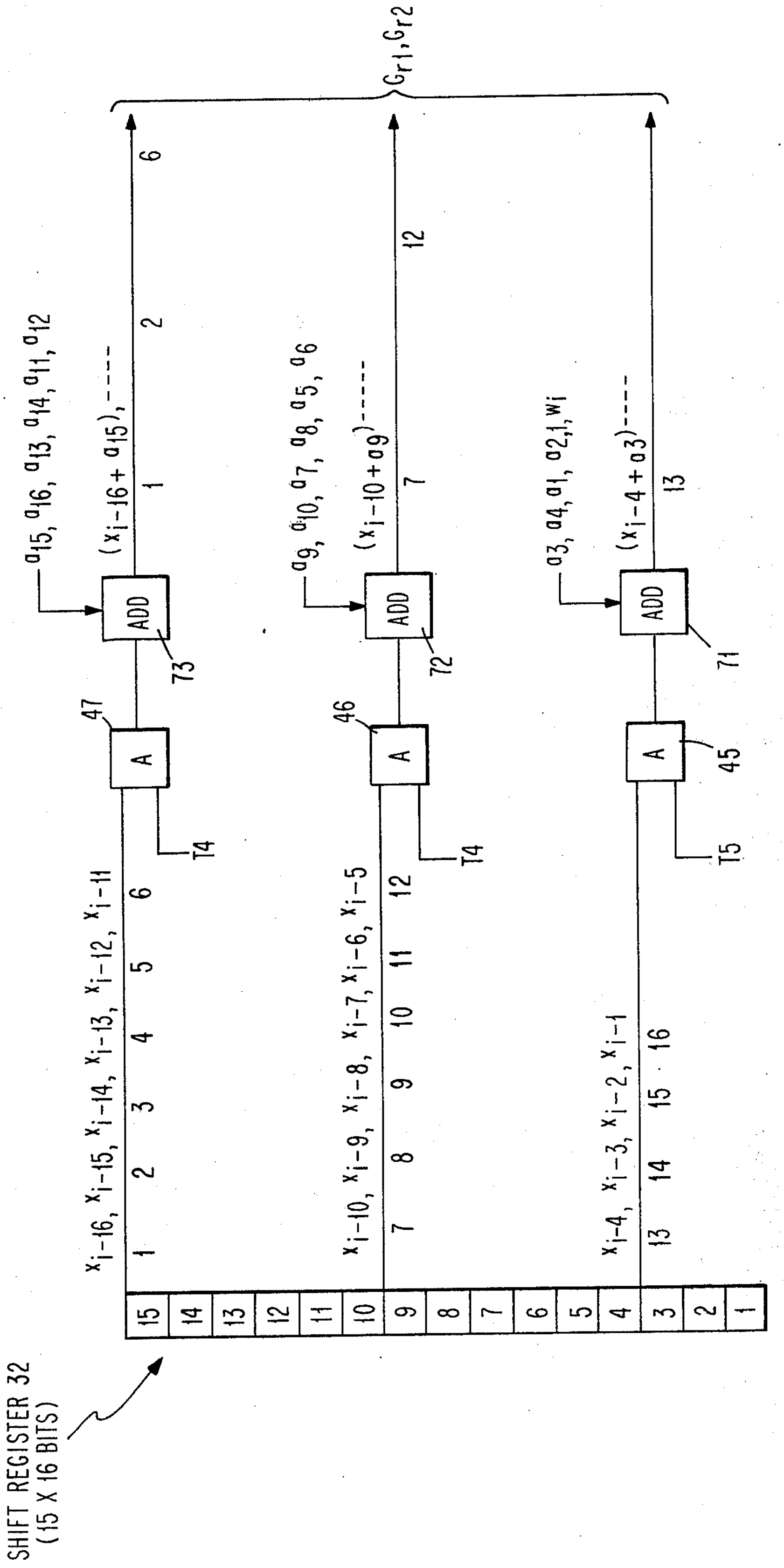

In operation, the bits comprising the words x are provided sequentially to the input 77 of AND gate 42 at a frequency $f_2$. This gate is activated by clock signal T2 and the first bit, $x_1$ of the word $x_i$, enters register 31 through OR gate 36. This bit travels through the register at a frequency defined by clock signal T1, that is, 16 times faster than the speed at which the individual bits of word $x_i$ are received. Since the output of register 31 is fed back to its input through AND gate 41 which is activated when signal T2 is at a low logic level (see FIG. 3A), bit $x_1$ will be in the second storage position of register 31 when the second bit, $x_2$, of word $x_i$ is received. Thereafter, the entity $x_2x_1$ will travel again through register 31, as shown in the table of FIG. 3A, and so forth. This operation amounts to a compression of the words $x_i$ such that, while signal T3 is at a high logic level, the 16 bits of $x_i$ are fed into register 32 through AND gate 44 and OR gate 37. Because the output from register 32, which register can store fifteen words of 16 bits each and is controlled by clock signal T1, is fed back to the input thereof, a further compression is effected such that, when $x_{i-1}$ reaches the input of AND gate 44, word positions 1 to 15 of register 32 contain $x_{i-2}, x_{i-3}, x_{i-4} \ldots x_{i-16}$, respectively. The words available at the taps corresponding to word positions 3, 9 and 15 (or bit positions 48, 144 and 240) are fed to adders 71, 72, and 73, respectively. The circulation of data in register 32 provides a flow of words $x$ to the inputs of AND gates 45, 46, and 47 in accordance with the diagram of FIG. 3C. It will be seen that gates 46 and 47 are activated by clock signal T4 during six periods T1, whereas gate 45 is activated by clock signal T5 during four periods T1. The reasons for this will be given later on. For the present, it should be noted that, with AND gates 45–47 open, the data are fed to adders 71, 72, and 73, to which the filter coefficients are applied in the order indicated in the table of FIG. 3B. When activated, AND gates 57–59 and 60–62 allow the outputs from adders AD1–AD3 to be alternatively fed to group $G_{r1}$ and to group $G_{r2}$ of CU 30 inputs under the control of clock signals T6 and T7. The distribution of the clock signals illustrated in FIG. 3A shows that during a first interval of duration T1, clock signal T6 being at a high level, the three inputs comprising group $G_{r1}$ receive the values $(x_{i-4}+a_3)$, $(x_{i-10}+a_9)$ and $(x_{i-16}+a_{15})$, respectively. Then, during a second interval of duration T1, signal T6 being at a low level and signal T7 at a high level, group $G_{r2}$ receives the outputs from adder stages 71, 72, and 73, i.e., $(x_{i-3}+a_4)$, $(x_{i-9}+a_{10})$, $(x_{i-15}+a_{16})$, respectively. CU 30 is then ready to compute and to serially apply to AND gate 54 the products of values received by pairs of inputs in groups $G_{r1}$ and $G_{r2}$, namely:

$$(x_{i-16}+a_{15})\ (x_{i-15}+a_{16}) + (x_{i-10}+a_9)\ (x_{i-9}+a_{10}) + (x_{i-4}+a_3)\ (x_{i-3}+a_4).$$

The result of this operation is fed to adder 80 through AND gate 54 which is activated by clock signal T8. During this operation, as shown in FIG. 3A, clock signal T6 is at a high level and clock signal T7 at a low level. Consequently, AND gates 57 to 59 are activated again and the $G_{r1}$ inputs receive $(x_{i-2}+a_1)$, $(x_{i-8}+a_7)$ and $(x_{i-14}+a_{13})$. Then, as before, AND gates 57 to 59 are deactivated and AND gates 60 to 62 are activated so that the $G_{r2}$ inputs receive $(x_{i-1}+a_2)$, $(x_{i-7}+a_8)$ and $(x_{i-13}+a_{14})$. As before, CU 30 sends to adder 80 the term resulting from the combination of the $G_{r1}$ and $G_{r2}$ inputs, namely: $(x_{i-2}+a_1)\ (x_{i-1}+a_2) + (x_{i-8}+a_7)\ (x_{i-7}+a_8) + (x_{i-14}+a_{13})\ (x_{i-13}+a_{14})$. During the transfer, the $G_{r1}$ inputs receive the new outputs from adders 71, 72 and 73. However, since clock signal T5 is at a low level, AND gate 45 is deactivated, and the output from 71 is therefore equal to C3, the values applied to the $G_{r1}$ inputs being:

1, $(x_{i-6}+a_5)$ and $(x_{i-12}+a_{11})$.

Then, as AND gates 57 to 59 close and AND gates 60 to 62 open, the $G_{r2}$ inputs receive:

$w_i$, $(x_{i-5}+a_6)$ and $(x_{i-11}+a_{12})$.

Consequently, the following is computed by CU 30 and sent to adder 80 when AND gate 54 is activated by signal T8:

$$w_i + (x_{i-6}+a_5)\ (x_{i-5}+a_6) + (x_{i-12}+a_{11})\ (x_{i-11}+a_{12}).$$

Thus, the device has so far computed the terms $u_i+w_i$. All that remains to be done is to compute the term $v_i$ in order to obtain $y_i$. The term $v_i$ will be provided by one of the two data compression devices which comprise registers 34 and 35, respectively. Multiplier 74 alternatively provides the terms of the form $-x_i.x_{i+1}$ to one or to the other of these devices 78 or 79 depending on whether clock signal T9 or T10 is at a high level. Register 34 will contain the words $-x_{i-1}.x_{i-2}$, $-x_{i-3}.x_{i-4}$, $-x_{i-5}.x_{i-6}$, etc., while register 35 will contain $-x_{i-2}.x_{i-3}$; $-x_{i-4}.x_{i-5} \ldots$. Thus, the term $v_i$ will be alternatively obtained at the outputs of AND gates 52 and 53. The operation $y_i = u_i + v_i + w_i$ will then be performed in adder 80. Finally, the data will be expanded back to normal or decompressed and sent to output y through AND gate 55, register 33 and AND gate 56.

Figure 4:
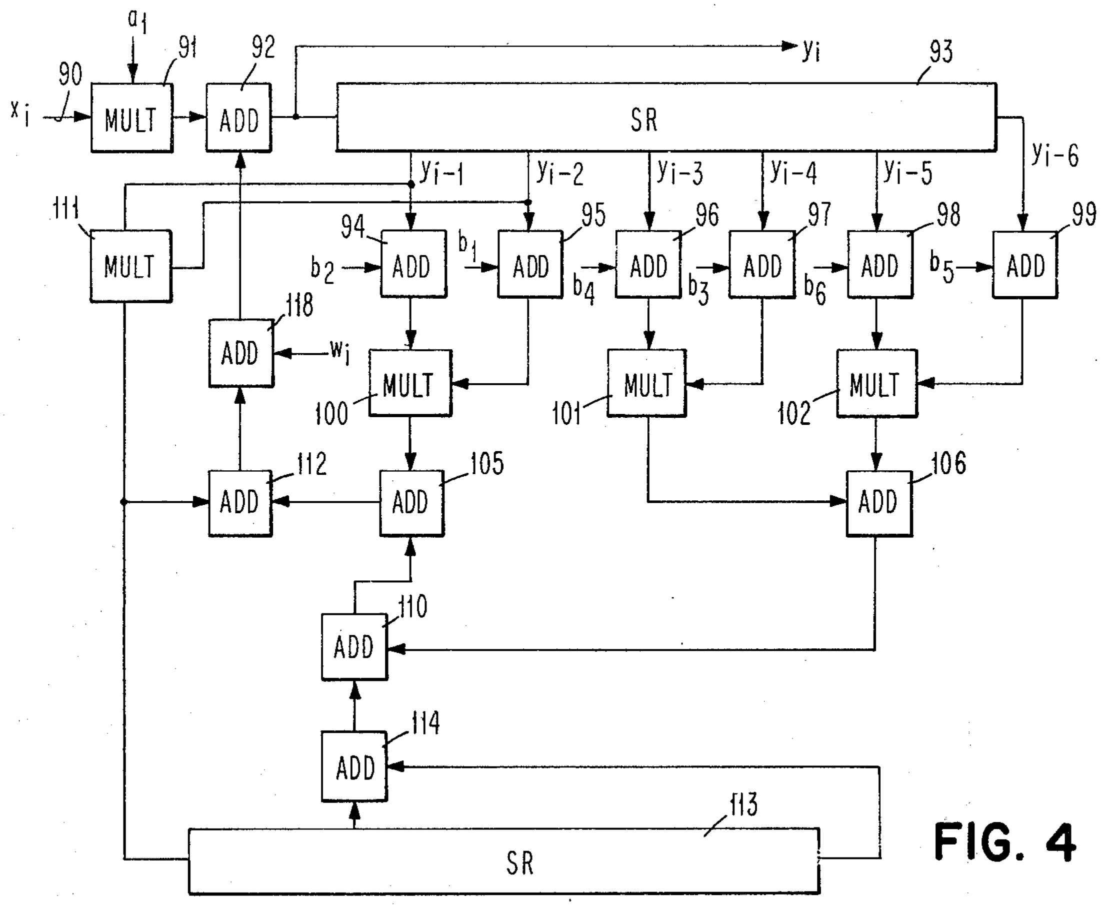
FIG. 4 shows a recursive filter realized in accordance with the invention.

Referring now to FIG. 4, a parallel recursive filter realized in accordance with the principles of the present invention and similar to the transversal filter of FIG. 2 is shown. For simplicity, it will be assumed that this recursive filter only has seven coefficients, $a_1, b_1, b_2 \ldots b_6$. The input line 90 is connected to one of the inputs of a multiplier 91, the other input of which receives coefficient $a_1$. The output of multiplier 91 is connected to the first input of an adder 92, the output of which provides $y_i$. The latter term is also fed to a shift register 93 the six taps of which provide $y_{i-1}, y_{i-2} \ldots y_{i-6}$, respectively. Each of the six taps is connected to a respective one of six adders 94–99, which also receive one of the coefficients $b_2, b_1, b_4, b_3, b_6, b_5$, respectively. The outputs from adders 94–95, 96–97 and 98–99 are fed to three multipliers 100, 101 and 102, respectively. The output from multiplier 100 is fed to the first input of an adder 105. The output from multipliers 101 and 102 are fed to the inputs of an adder 106, the output of which is sent to the first input of an adder 110. A multiplier 111 computes the product $-y_{i-1}.y_{i-2}$. The output from multiplier 111 is simultaneously sent to an adder 112 and to the input of a tapped delay line 113. The output from line 113 is fed to the first input of an adder 114, the second input of which receives $-y_{i-3}.y_{i-4}$ from one of the taps of line 113. The output from adder 114 is fed to the second input of adder 110, the output from which is applied to the second input of adder 105. The output from adder 105 is fed to the second input of adder 112. The output from adder 112 is fed to the first input of an adder 118, the second input of which receives the constant term $w_i$. The output from adder 118 closes the loop of the recursive filter by feeding data to the second input of adder 92.

At the time a sample $x_i$ is applied to the input of the filter, the register 93 contains $y_{i-1}, y_{i-2} \ldots y_{i-6}$. Once the coefficients $b_1, b_2 \ldots b_6$ have been added to these values and the resulting terms multiplied in pairs, multipliers 100 to 102 will provide:

100 $(y_{i-1}+b_2)\ (y_{i-2}+b_1)$.

101 $(y_{i-3}+b_4)\ (y_{i-4}+b_3)$.

102 $(y_{i-5}+b_6)\ (y_{i-6}+b_5)$.

Accordingly, the following will be obtained at the output of adder 106:

$(y_{i-5}+b_6)\ (y_{i-6}+b_5) + (y_{i-3}+b_4)\ (y_{i-4}+b_3)$, this value being applied to adder 110, which also receives from adder 114:

$-y_{i-3}.y_{i-4}-y_{i-5}.y_{i-6}$.

Therefore, adder 112 will provide:

$$(y_{i-1}+b_2)\ (y_{i-2}+b_1) + (y_{i-3}+b_4)\ (y_{i-4}+b_3) + (y_{i-5}+b_6)\ (y_{i-6}+b_5) - (y_{i-1}y_{i-2}-y_{i-3}y_{i-4}-y_{i-5}y_{i-6} = u_i+v_i.$$

The constant term $w_i = -b_1b_2-b_3.b_4-b_5.b_6$ is then added to the above value in adder 118.

Since the result of the latter operation is itself added in adder 92 to the term $a_1x_i$ provided by multiplier 91, the following will finally be obtained at the output of adder 92:

$$y_i = a_1x_i + (y_{i-1}+b_2)(y_{i-2}+b_1) + (y_{i-3}+b_4)(y_{i-4}+b_3) + (y_{i-5}+b_6)(y_{i-6}+b_5) - y_{i-1}\cdot y_{i-2} - y_{i-3}\cdot y_{i-4} - y_{i-5}\cdot y_{i-6} - b_1b_2 - b_3b_4 - b_5b_6 = a_1x_i + b_1y_{i-1} + b_2y_{i-2} + b_3y_{i-3} + b_4y_{i-4} + b_5y_{i-5} + b_6y_{i-6}$$

Figure 5A:
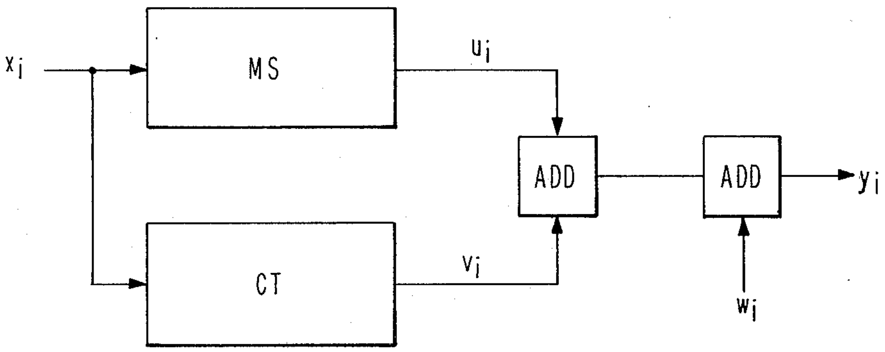
FIGS. 5A and 5B are block diagrams of the invention as embodied in a transversal and recursive filter, respectively.
Figure 5B:
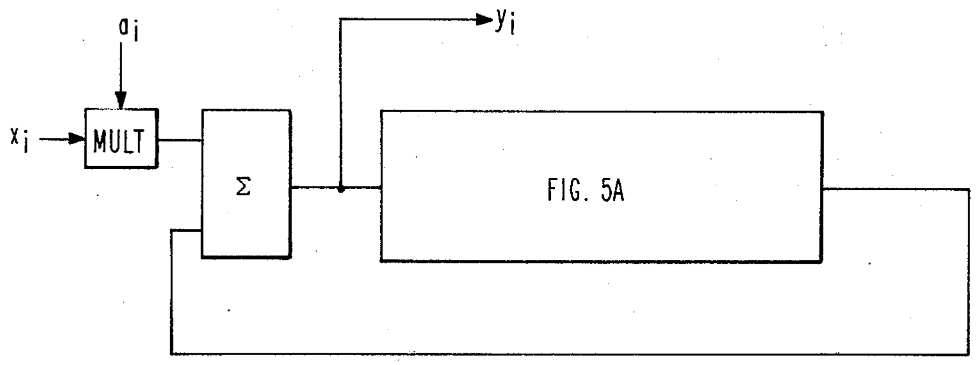
Figure 6A:
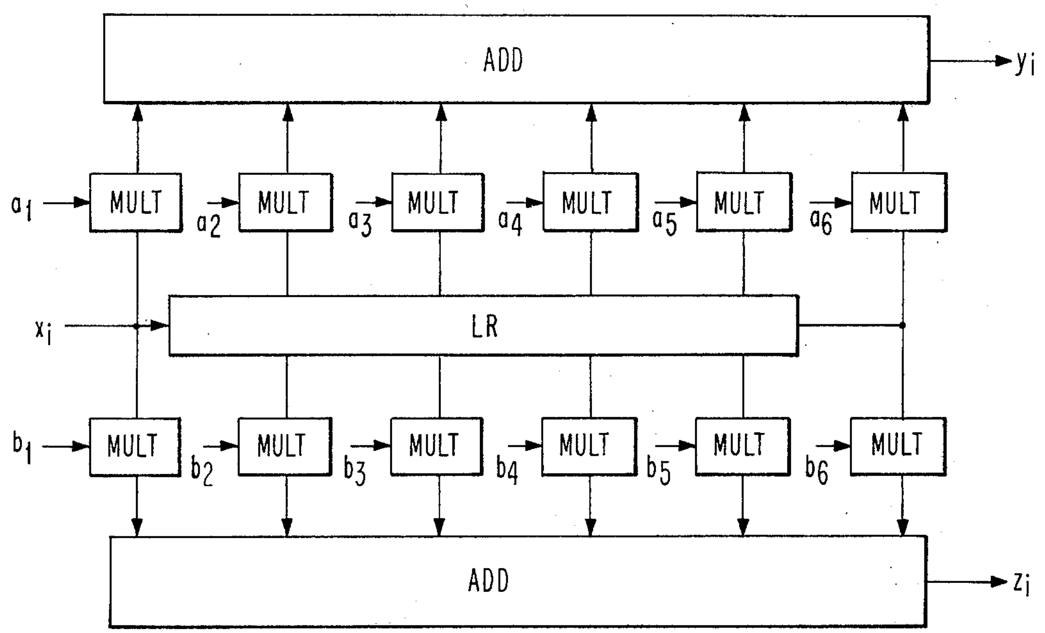
FIGS. 6A and 6B show a bank of filters.
Figure 6B:
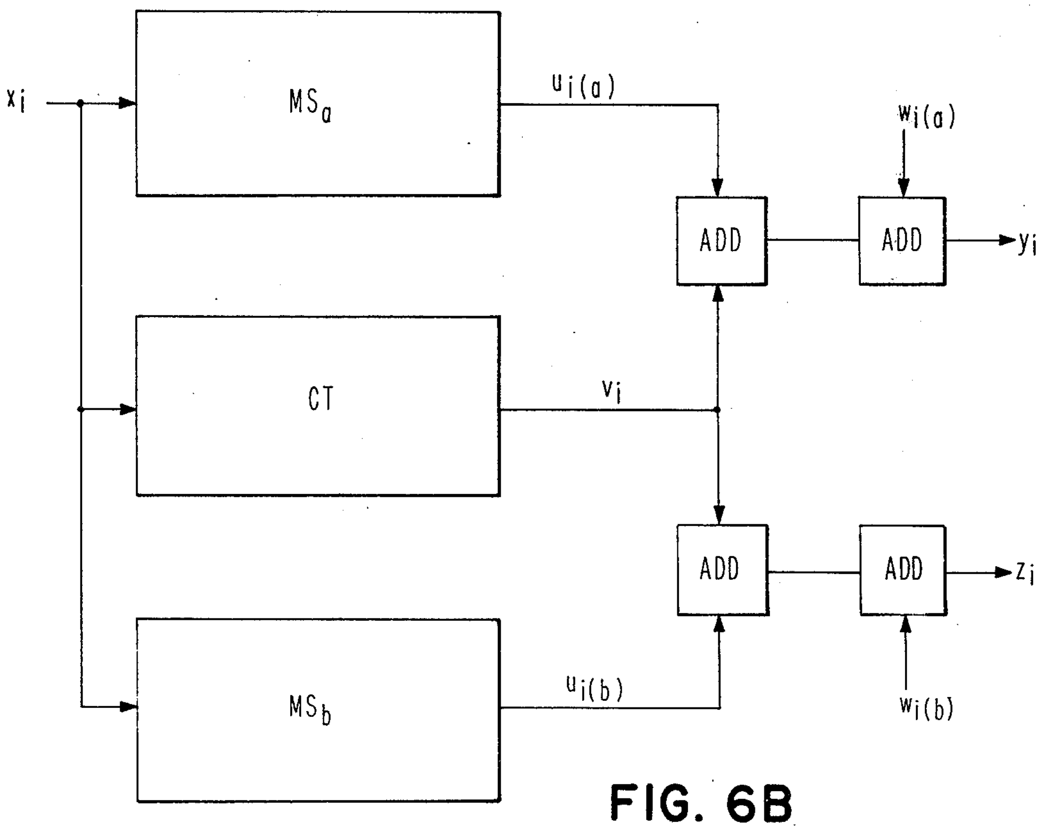

It will thus be seen that the purely recursive part of a digital filter, that is, the part which computes the term $$\sum_{1}^{n} b_k \cdot y_{i-k}, \qquad (4)$$

can, in the same manner as for a complete transversal filter which computes the term $$\sum_{1}^{n} a_k \cdot x_{i-k}, \qquad (1)$$

be implemented using about half the number of multipliers required with a prior art filter. Furthermore, the device that performs either operation (1) or (4) is essentially comprised of two parts, MS and CT, see FIG. 5A, which form the main term $u_i$ and the corrective term $v_i$, respectively, part CT being completely unaffected by the filter coefficients. In addition to the advantages already mentioned above, this structure can readily be used to implement a bank of filters intended to perform several different filterings of the same signal $x$. If a conventional filter were used to this end, no substantial reduction in the number of computation circuits would be possible, as is evident in FIG. 6A showing such a filter. On the other hand, a substantial reduction can be achieved with the structure of the present invention, as shown in FIG. 6B, where stage CT is common to all of the filters in the bank.

Although the design of the recursive filter described above is similar to that of the transversal filter of FIG. 2, the serial techniques mentioned in relation to FIG. 3 are also applicable.

The present invention is particularly useful in the field of data transmission and, more specifically, in designing communication equalizers. In this connection, it will be recalled that the signals sent on a transmission line are subjected during their propagation to noise and distortions whose effects must be eliminated at the receiving end. This is usually done by means of filters called equalizers whose coefficients are adjusted either manually or automatically. Since, in practice, each equalizer requires a substantial number of coefficients, each requiring processing logic, the advantages of the present invention are obvious.

Figure 7A:
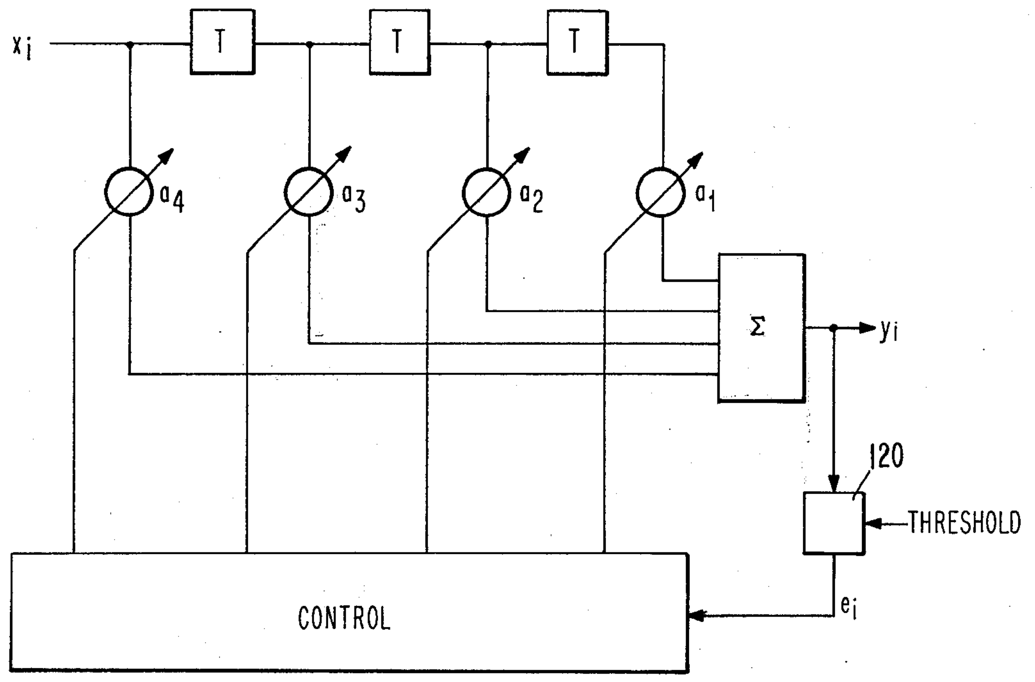
FIGS. 7A and 7B show a prior art equalizer.
Figure 7B:
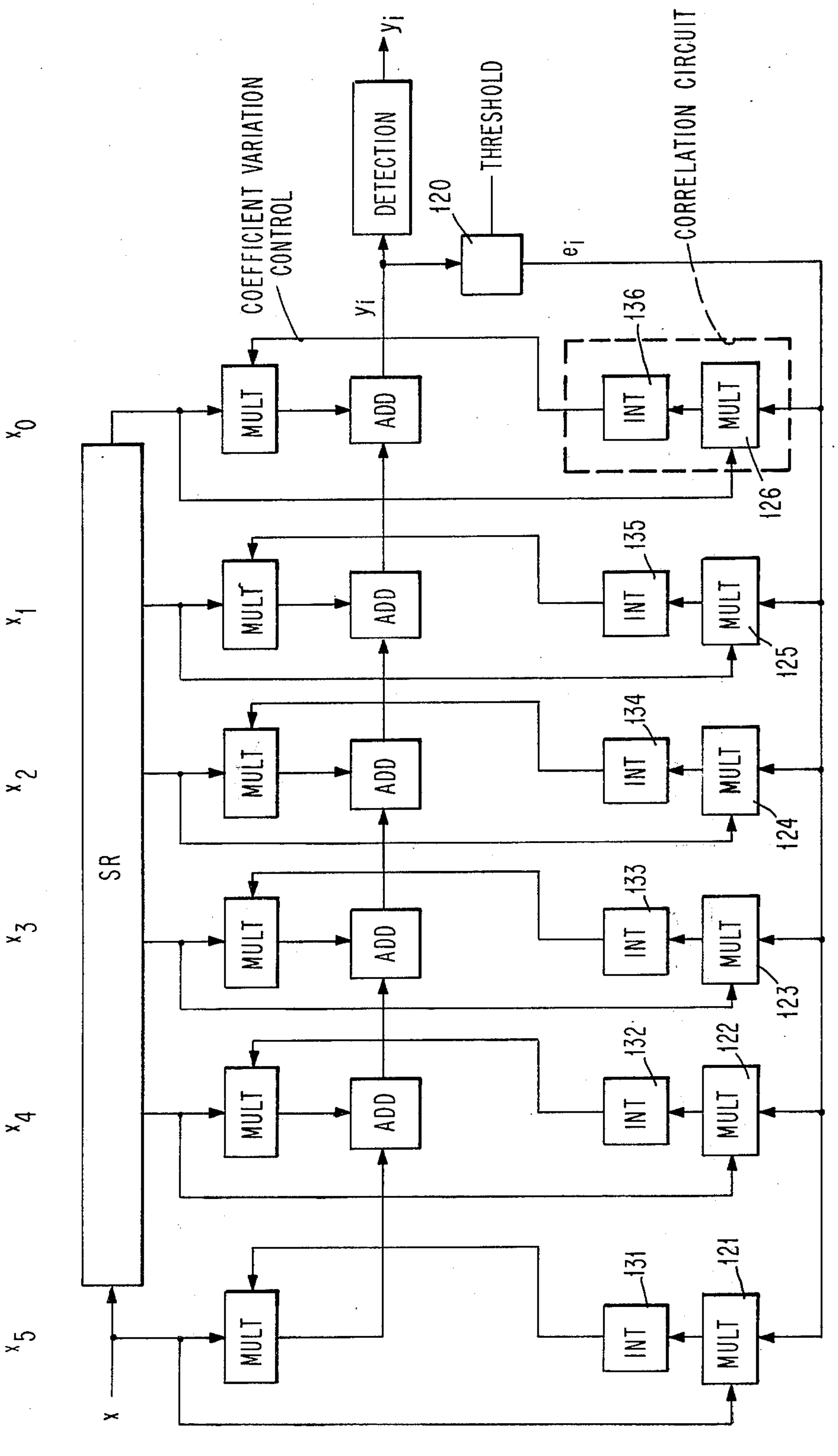

To facilitate an understanding of the device described hereafter, it may be helpful to briefly review the general features of a typical equalizer, as illustrated in FIGS. 7A and 7B.

FIG. 7A shows a typical prior art automatic equalizer comprising a transversal filter similar to that of FIG. 1 and a control device (CTRL). The latter device constitutes a feedback loop which automatically controls the variations of each of the filter coefficients so as to minimize the so-called error signal $e_i$ derived from $y_i$ by means of a comparison in a detector 120 with a reference or threshold value. The article entitled "A Simple Adaptive Equalizer for Efficient Data Transmission" by D. Hirsch and W. J. Wolf, published in Wescon Technical Papers, Part 4, 1969, provides information which will be found useful in gaining a better understanding of the present invention. This invention applies to all equalizers, including automatic equalizers that use the modified zero-forcing (MZF) or the mean-square (MS) method. The latter method, which provides a better degree of equalization, will be used herein to illustrate the application of the present invention.

As shown in FIG. 7B, which illustrates a particular embodiment of the prior art equalizer of FIG. 7A and is similar to FIG. 3 of the article referred to above, the signal intended to control the variation of a coefficient $a_k$ (where $k = 0, 1 \ldots 5$) at instant $i$ is obtained by correlating the error signal $e_i$ from detector 120 to the signal $x_k$ available at the corresponding tap of the shift register. If the arrangement of FIG. 7B were implemented in accordance with the techniques illustrated in FIG. 1A, the number of multipliers required would be equal to twice the number of coefficients of the filter. With the present invention, a reduction in the number of multipliers used in the filter as well as in the feedback loop becomes possible. As far as the transversal filter proper is concerned, the reduction in the number of multipliers results from the use of one of the schemes previously described such as that illustrated in FIG. 2A. A particular advantage of the invention is that it also applies to the control device CTRL of the equalizer. That is, at any instant $t_{i-1}$, the error signal $e_{i-1}$ normally causes the values $e_{i-1}x_{i-7}$, $e_{i-1}x_{i-6}$, $e_{i-1}x_{i-5}$, $e_{i-1}x_{i-4}$, $e_{i-1}x_{i-3}$, and $e_{i-1}x_{i-2}$ to be obtained at the respective outputs of the multipliers 121 to 126 of the correlation circuits of a six-coefficient equalizer (FIG. 7B); then, at the next instant $t_i$, the error signal having become $e_i$, multiplier stages 121 to 126 provide the values $e_ix_{i-6}$, $e_ix_{i-5}$, $e_ix_{i-4}$, $e_ix_{i-3}$, $e_ix_{i-2}$, and $e_ix_{i-2}$, and $e_ix_{i-1}$, respectively. Consequently, if the operations that take place in the control loop of the equalizer are examined during a time interval corresponding to two sampling periods of signal $x$, integrator 131 will have to perform the operation:

$$S1 = e_{i-1}x_{i-2} + e_ix_{i-1} = (e_{i-1}+x_{i-1})(e_i+x_{i-2}) - x_{i-1}x_{i-2} - e_{i-1}e_i$$

Each of the integrators 132 to 136 will have to perform a similar operation. The principles of the present invention can, therefore, also be applied to the control loop of the equalizer.

The terms of the form $x_{i-1}x_{i-2}$ are already available in the filter and no additional circuits are therefore required to compute them. The term of the form $e_{i-1}e_i$ is the same for all of the stages 131–136 so that the computation thereof will only necessitate the use of a single multiplier in the entire control loop. Accordingly, the computation of all the terms which serve to control the coefficients of the filter when the latter is used for equalization purposes will only necessitate $n/2+1$ multipliers instead of n multipliers as required in a conventional equalizer with n coefficients, every pair of multiplications being reduced to a single multiplication.

Figure 8A:
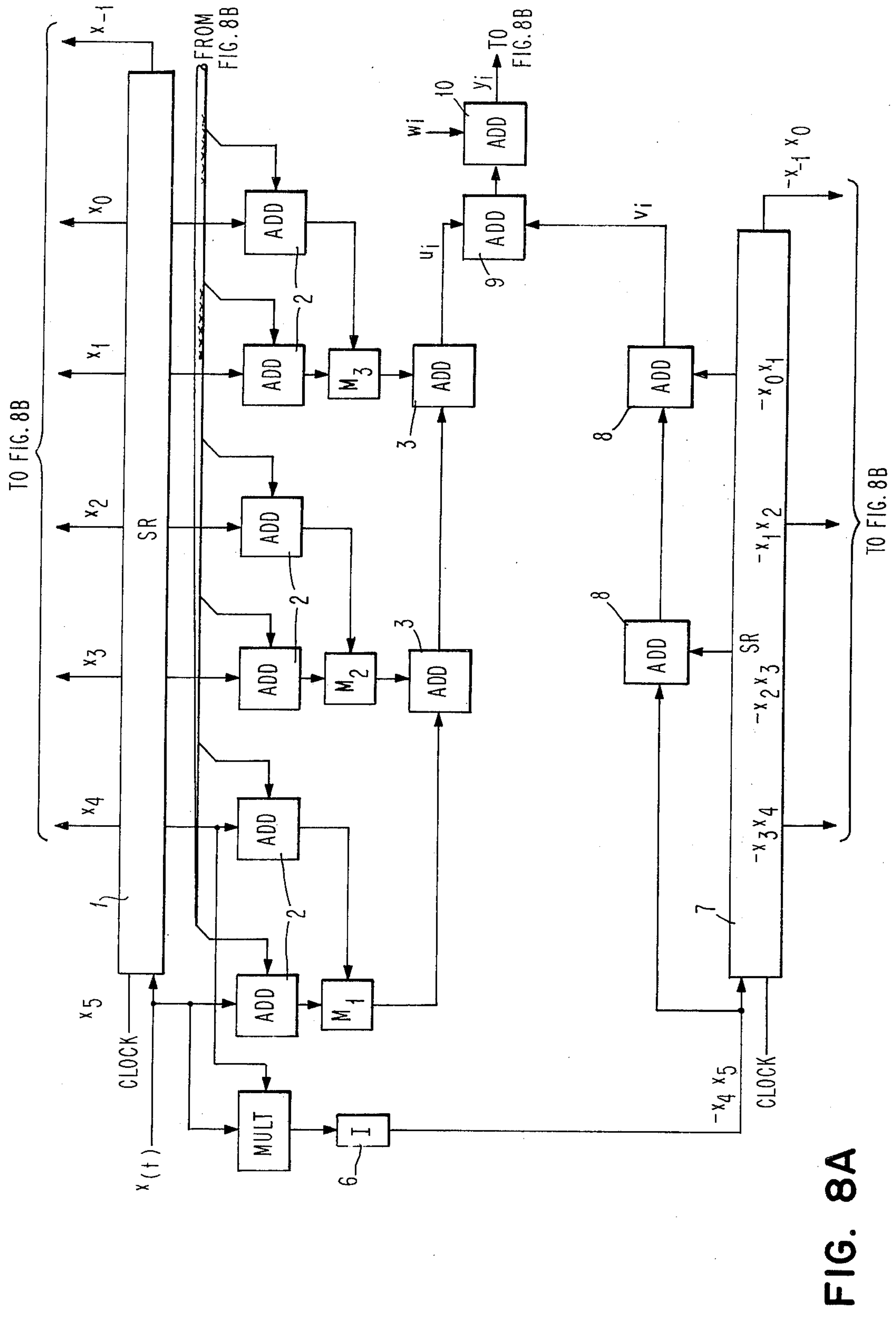
FIG. 8A shows the transversal filter of another equalizer realized in accordance with the invention.
Figure 8B:
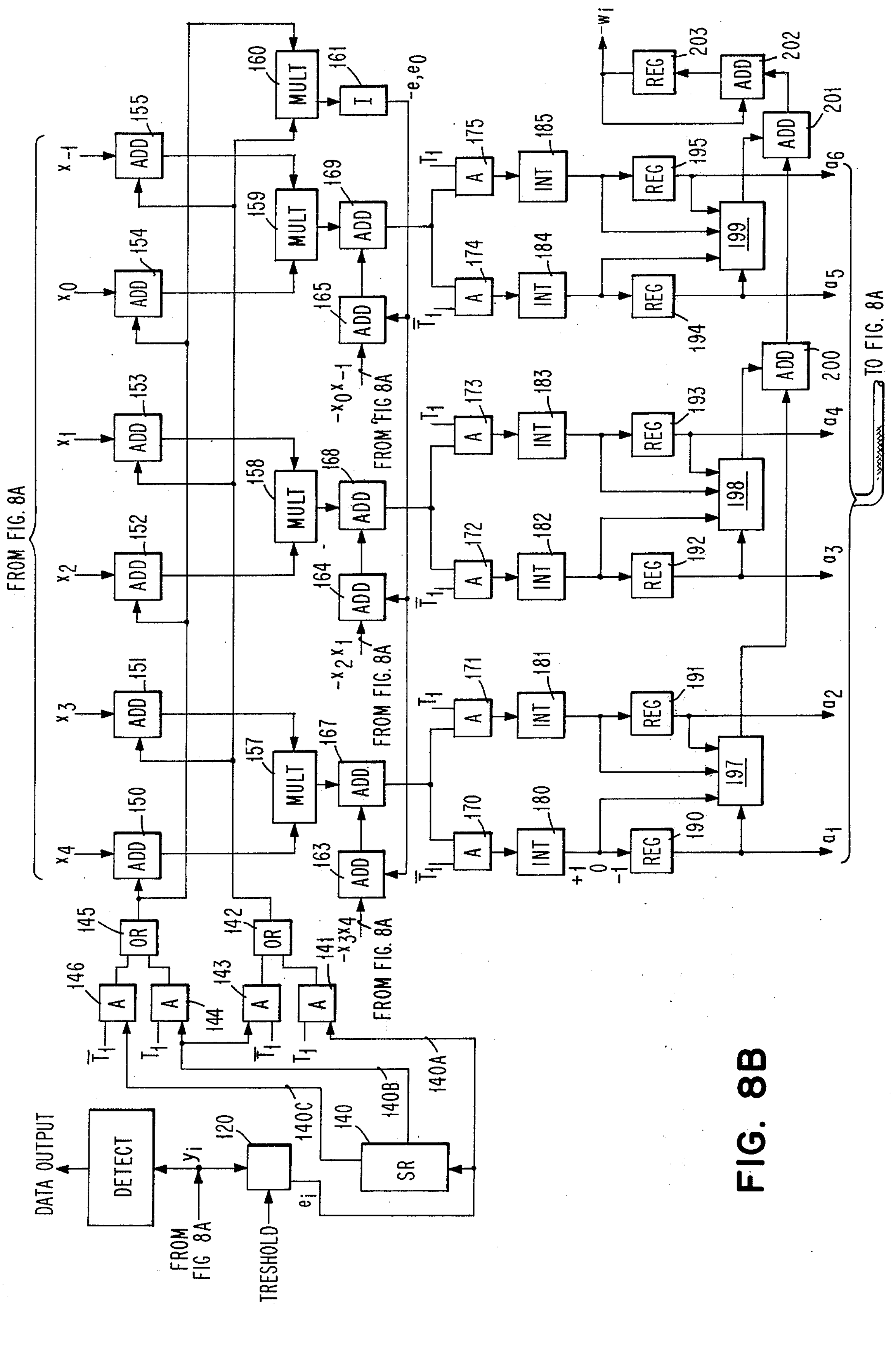
FIG. 8B shows the coefficient control loop of the equalizer of FIG. 8A.

Referring now to FIGS. 8A and 8B, an equalizer realized, in accordance with the principles of the present invention is illustrated. FIG. 8A shows a tapped transversal filter which is similar to that of FIG. 2A and has been given the same reference characters. It should, however, be noted that the shift registers 1 and 7 of FIG. 8A differ from those of FIG. 2A in that register 1 of FIG. 8A includes one additional tap while register 7 of FIG. 8A is provided with intermediate taps corresponding to storage positions $x_{i-6}x_{i-7}$, $x_{i-4}x_{i-5}$ and $x_{i-2}x_{i-3}$, i.e., for the illustrated sample where $i=6$ and sample $x_5$ is being received, the values at the taps are $x_0x_{-1}$, $x_2x_1$ and $x_4x_3$. These being the only differences, the filter of FIG. 8A will not further be described. The remainder of the equalizer is shown in FIG. 8B and serves to control the coefficients applied to the adders 2 of the device of FIG. 8A. To this end, the output $y_i$ from the transversal filter, FIG. 8A, is fed to a device 120 which serves to determine the error signal $e_i$ and the output of which is fed to the input of a two-stage shift register 140. Three taps, 140A, 140B, and 140C are provided at the input, in the middle and at the output of register 140, respectively. Tap 140A is connected to one of the inputs of an AND gate 141 which is conditioned by a clock signal T1. The output of gate 141 is connected to one of the inputs of an OR gate 142, the other input of which is connected to the output of an AND gate 143 which is conditioned by clock signal $\overline{T1}$ and also connected to tap 140B. Tap 140B is also connected to the input of an AND gate 144 which is conditioned by clock signal T1 and the output of which is connected to one of the inputs of an OR gate 145, the other input of which is connected to the output of an AND gate 146 which is conditioned by clock signal $\overline{T1}$ and connected to tap 140C. The output of OR gate 145 is connected to one of the inputs of each of the adders 150, 152, and 154, while the output of OR gate 142 is connected to one of the inputs of each of the adders 151, 153, and 155. The outputs of 150–151, 152–153, and 154–155 are respectively connected to the inputs of three multipliers 157, 158 and 159. The outputs of OR gates 145 and 146 are also connected to the inputs of a multiplier 160, the output of which is inverted by an inverter 161 and simultaneously sent to one of the inputs of each of the adders 163, 164, and 165, the other inputs of which receive the data provided by the intermediate taps of shift register 7, FIG. 8A, respectively. Adders 167, 168, and 169 add together the outputs from adder 163 and multiplier 157, the outputs from adder 164 and multiplier 158 and the outputs from adder 165 and multiplier 159, respectively. The output from adder 167 is fed to one of the inputs of AND gates 170 and 171 which are conditioned by clock signals $\overline{T1}$ and T1, respectively. Similarly, the output from adder 168 is fed to AND gates 172 and 173 which are conditioned by clock signals $\overline{T1}$ and T1, respectively, and the output from adder 169 is fed to AND gates 174 and 175 which are conditioned by clock signals $\overline{T1}$ and T1, respectively. The outputs from gates 170 to 175 are fed to counters 180–185, respectively which counters accomplish an integration function. Any overflow condition associated with these counters is signaled to one of the registers 190–195. The inputs and outputs of registers 190 and 191 are all connected to a circuit 197. Similarly, the inputs and outputs of 192, 193 and 194, 195 are connected to circuits 198 and 199, respectively. The outputs from circuits 197, 198, and 199 are added together in adders 200 and 201. The output from adder 201 is fed to a circuit comprising an adder 202 and a register 203 connected in series. The output from register 203 is fed back as an input to adder 202.

Operation of the control loop of the equalizer is initiated by alternatively activating the even-numbered gates and the odd-numbered gates. For simplicity, it will be assumed that the equalizer is being examined at the instant sample $x_5$ is received at input $x$ and that, at the same instant, $y_i$ is provided by the transversal filter, FIG. 8A, while error signal $e_1$ is provided by the device 120, the output of which is connected to shift register 140. Thus, the previous error signals $e_0$ and $e_{-1}$ are also available. If clock signal $\overline{T1}$ is initially at a high logical level, AND gates 143 and 146 are activated and adders 167, 168 and 169 will provide the result of the operation they are performing to counters 180, 182, and 184, respectively. Then, when clock signal T1 is at a high logical level, counters 181, 183, and 185 will receive the results of the operations performed by adders 167, 168, and 169 respectively. For example, with signal $\overline{T1}$ at a high level, counter 180 will receive $e_{-1}x_3+e_0x_4$. The error signal then becomes $e_2$, sample $x_5$ is fed to the input of the filter and the above process continues. AND gate 171 is activated and counter 181 receives $e_1x_4+e_2x_5$; then signal $\overline{T1}$ is at a high level again and counter 180 receives $e_1x_5+e_2x_6$, and so on.

In the present invention, the filter coefficients are adjusted by increments, that is, by adding +1 or −1 to their value. The indications necessary to adjust the coefficients are obtained by detecting the changes in the contents of counters 180 to 185. These indications are respectively used to increment or decrement the contents of registers 190–195, which provide the new values of coefficients $a_1$–$a_6$ of the register.

In view of the changing values of the coefficients, the value $w_i = -(a_1a_2+a_3a_4+a_5a_6)$ must be updated. To this end, circuits 197, 198, and 199 provide, according to the changes in the coefficient values, the corrective elements for $w_i$ which are then added to the previous value of $w_i$ in an adder 202.

While the invention has been particularly shown and described with reference to a preferred embodiment thereof, it will be understood by those skilled in the art that the foregoing and other changes in form and detail may be made therein without departing from the spirit and scope of the invention.

what is claimed is:

1. A digital filter of the type wherein each sample $y$ of an output signal is derived from the sum of a plurality of input signals $z$ each modified with one of a number of algebraic coefficients $\alpha$, said filter including:

a first shift register to store digital signals representing successive samples of an information signal and providing said signals at intermediate and final outputs of said register;

a plurality of adders connected to the outputs of said first shift register and to signal sources representing said coefficients to weight said digital signals of said samples;

a number of multiplying devices each to receive the adder outputs representing an adjacent pair of said weighted samples;

adding devices connected to the outputs of said multiplying devices to generate a term $$u_i = \sum_{0}^{N/2-1} (z_{i-2p-1} + \alpha_{2p+2})(z_{i-2p-2} + \alpha_{2p+1});$$

another multiplier receiving said input signal and the immediately preceding input signal from said first shift register to generate a product term;

an inverter to change the sign of said product term;

a second shift register to receive and store a sequence of said inverted product terms;

a second plurality of adders connected to the input and taps on said second shift register to generate a term $$v_i = -\sum_{0}^{N/2-1} z_{i-2p-1} \cdot z_{i-2p-2}; \text{ and}$$

other adders to additively combine said terms $u_i$ and $v_i$ with a constant term derived from said coefficients $\alpha$ to provide samples $y_i$ of said output signal.

2. A digital filter as set out in claim 1, including:

devices responsive to the output samples $y_i$ generated from the outputs of said first and said second shift registers to generate an error signal representative of the divergences of said samples $y_i$ from a standard;

summing and multiplying circuits connected to the outputs of said first and second shift registers and receiving said error signal to generate a number of output data signals each representing a desired change in a related algebraic coefficient; and a group of integrating and registering logic circuits to individually process said change representing output signals to modify said algebraic coefficients.

* * * * *